United States Patent [19]
Flessner et al.

[11] 3,937,332
[45] Feb. 10, 1976

[54] DEVICE FOR MOVING LONG AND THIN BODIES INTO NARROW SPACES, ESPECIALLY FOR CONTROL TURN-OFF BARS OR THE LIKE OF CORE REACTORS

[75] Inventors: Hinrich Flessner; Ulfert Paeserack, both of Wilhelmshaven, Germany

[73] Assignee: Fried. Krupp Gesellschaft mit beschrankter Haftung, Germany

[22] Filed: Feb. 21, 1974

[21] Appl. No.: 444,462

[30] Foreign Application Priority Data
Feb. 21, 1973  Germany............................ 2308533

[52] U.S. Cl.................. 214/1 P; 176/30; 214/18 N; 294/86 A
[51] Int. Cl.²........................................ B66C 19/00
[58] Field of Search............ 214/18 N, 1 P, 2.5, 3.1, 214/27; 294/86 A; 176/30, 31

[56] References Cited
UNITED STATES PATENTS

| | | | |
|---|---|---|---|
| 2,206,185 | 7/1940 | Graham et al................... | 214/1 P X |
| 2,829,783 | 4/1958 | Blagg................ | 214/1 P X |
| 3,768,668 | 10/1973 | Schukei......................... | 214/18 N X |

FOREIGN PATENTS OR APPLICATIONS

| | | | |
|---|---|---|---|
| 873,597 | 6/1971 | Canada............................ | 294/86 A |

*Primary Examiner*—Frank E. Werner
*Attorney, Agent, or Firm*—Walter Becker

[57] ABSTRACT

A device for moving long and thin bodies into narrow spaces by means of a gripper which is adapted to be lifted and lowered and on which the long thin bodies are suspended. This device, which is particularly well suited for control bars, shut-off bars, and the like of core reactors, is characterized primarily in that for laterally supporting the lower ends of the long thin bodies when the latter by means of the gripper have been pulled out from the respective narrow spaces in which they were previously received, at least one gripper means is so arranged at the lower end of a holder vertically slidably guided on the supporting member for the gripper means that the gripper means can be brought into and out of engagement with the lower ends of the long thin bodies.

6 Claims, 8 Drawing Figures

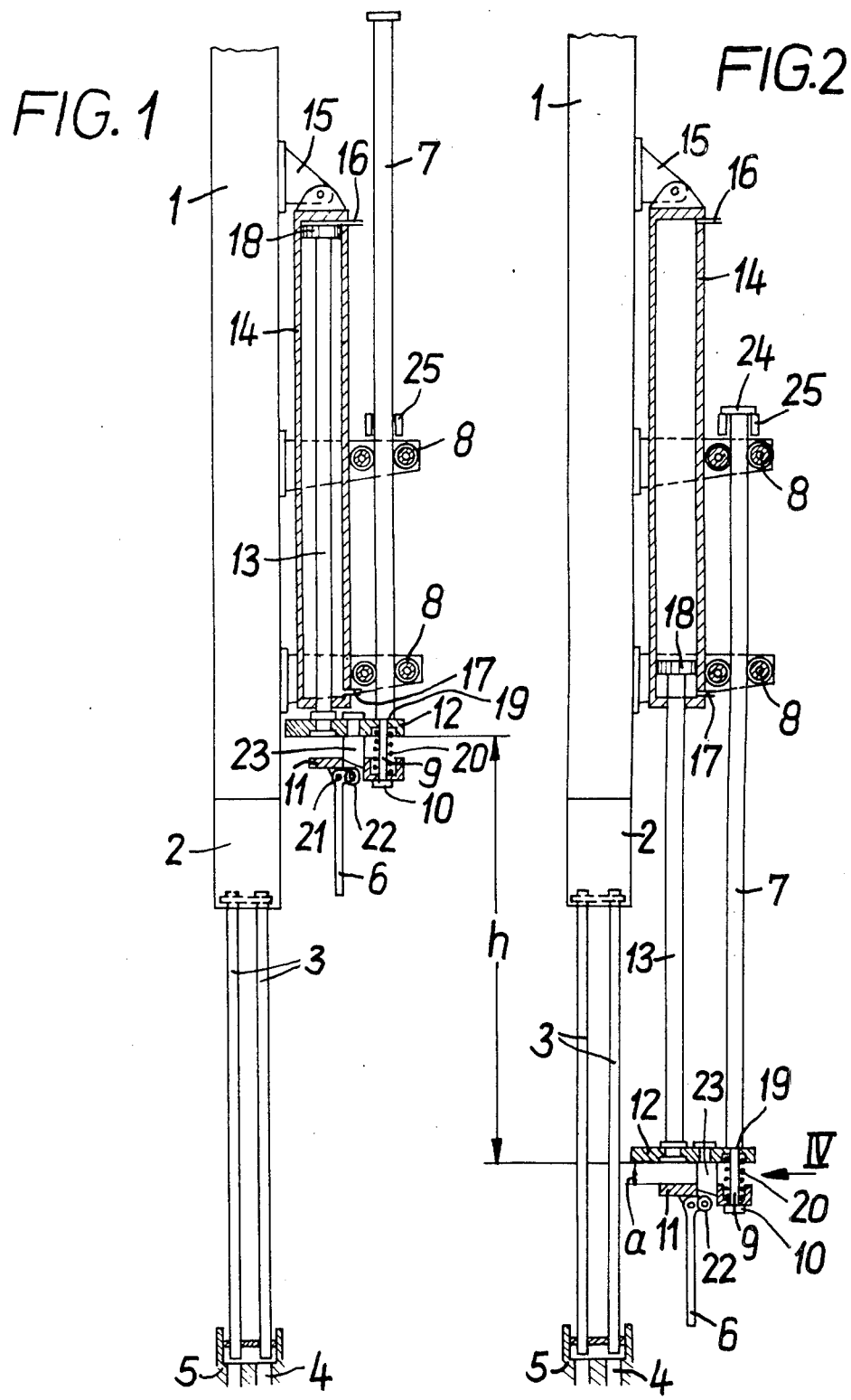

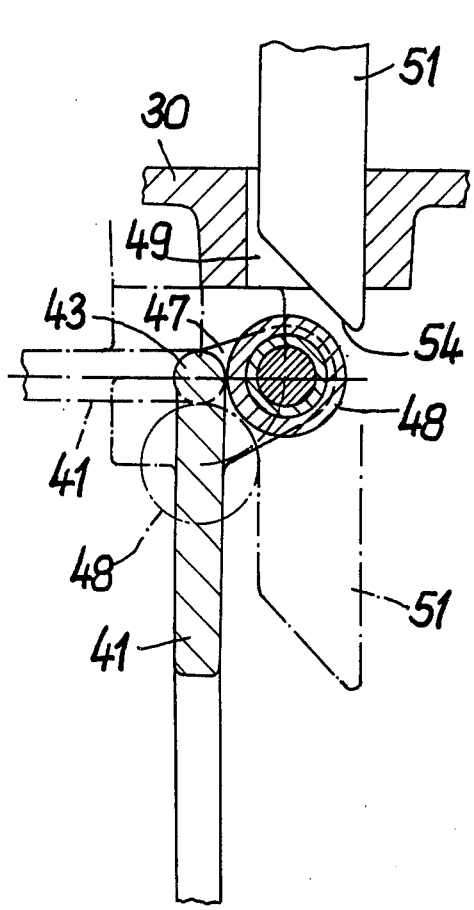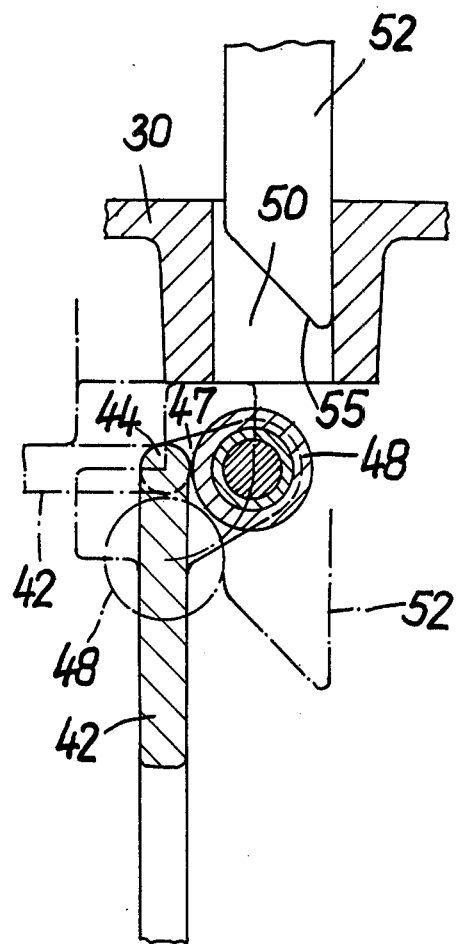

DEVICE FOR MOVING LONG AND THIN BODIES INTO NARROW SPACES, ESPECIALLY FOR CONTROL TURN-OFF BARS OR THE LIKE OF CORE REACTORS

In core reactors it is necessary, for instance, to pull control or turn-off bars from their positions and to move such control or turn-off bars into new positions. In this connection, a group of bars is suspended on a head plate grasped by a gripper. Inasmuch as the bars are generally very long and thin, they have, for instance, with the length of from 3 to 4 meters a diameter of from 1 to 2 centimeters, it is difficult to mount such bars for purposes of introducing the same into the narrow positioning bores. This is due to the fact that the long thin bars, due to the moving and lowering operations easily start oscillating and furthermore if they were already exposed to a heating process, no longer have the required parallelity.

It is, therefore, an object of the present invention to provide a device for inserting long thin bodies into narrow spaces, which will overcome the above mentioned drawbacks and will do so also if long thin bodies other than control and shut-off rods for core reactors are involved.

These and other objects and advantages of the invention will appear more clearly from the following specification, in connection with the accompanying drawings, in which:

FIGS. 1 to 4 diagrammatically illustrate partially in side view, and partially in section an embodiment of the present invention.

More specifically, FIGS. 1 – 3 illustrate a device for pulling out and inserting control bars into a core reactor part in three different positions respectively.

FIGS. 5 – 8 illustrate a modified device according to the present invention.

Figure 5:
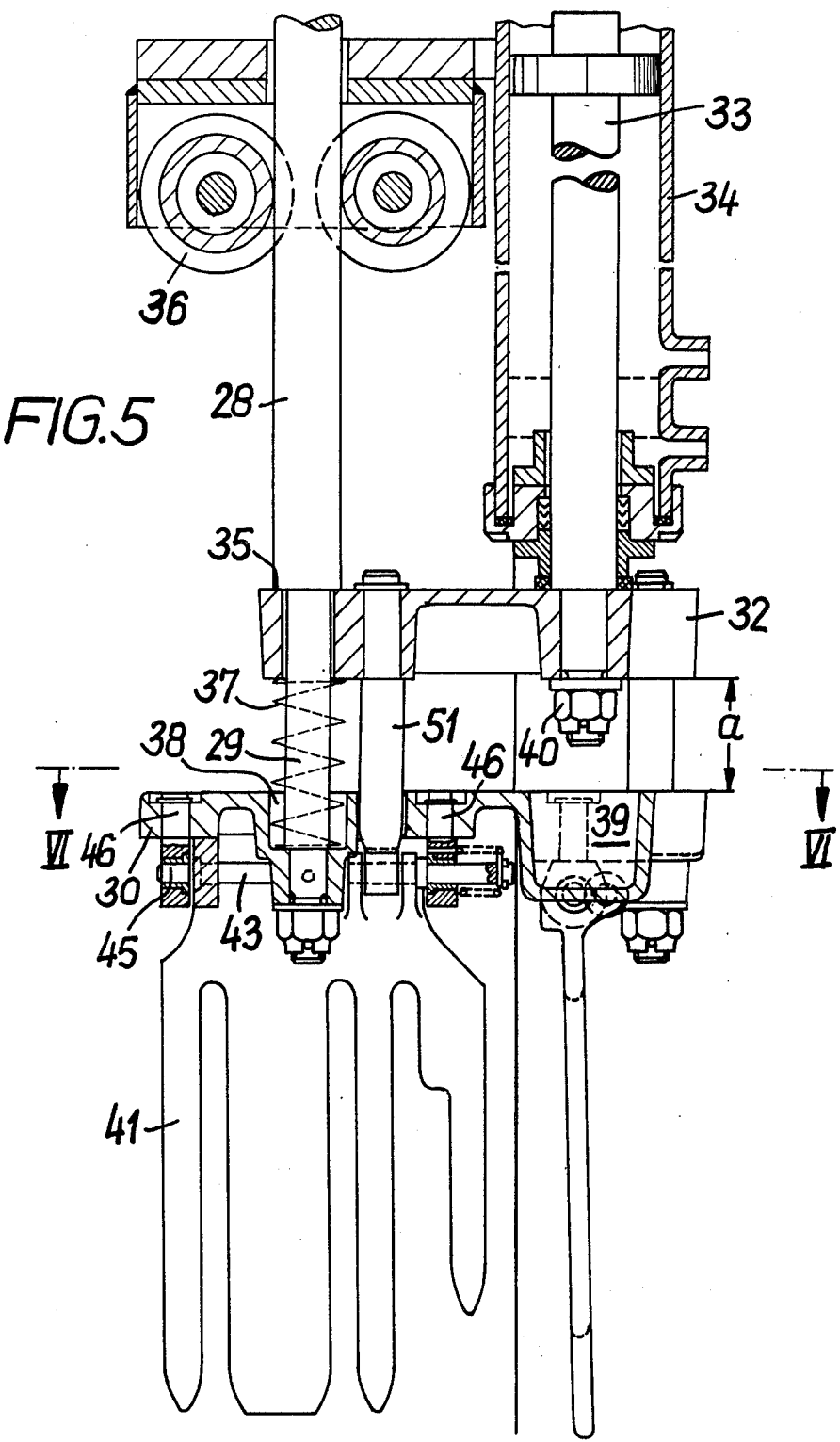
Figure 6:
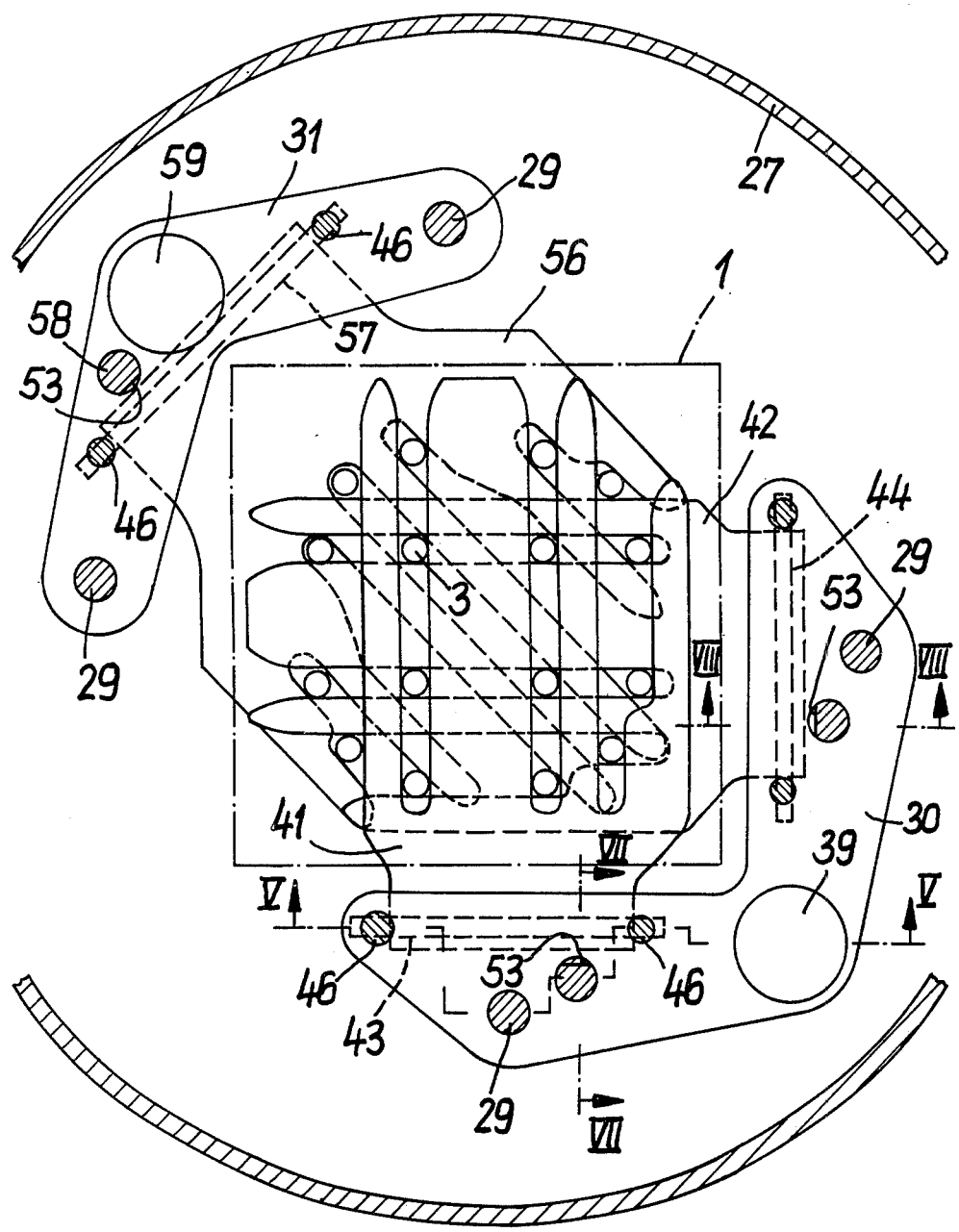

More specifically, FIG. 5 is a vertical section through a portion of the device, said section being taken along the line V—V of FIG. 6.

FIG. 6 represents a section taken along the line VI—VI of FIG. 5.

FIG. 7 illustrates on a larger scale than FIG. 6, a section taken along the line VII—VII of FIG. 6.

FIG. 8 illustrates, likewise on a larger scale than that of FIG. 6, a section taken along the line VIII—VIII of FIG. 6.

The device according to the present invention is characterized primarily in that for purposes of laterally supporting the lower ends of the long thin bodies when the same are, by means of the gripper, pulled out of the narrow spaces, there is at least one gripper element so arranged at the lower end of a holding means vertically displaceably guided at the lower end of a supporting body that said last mentioned gripper element can be moved into and out of engagement with the lower ends of the long thin bodies.

The invention brings about the advance that rods, or the like, which are very thin in comparison to their length and are conveyed in a suspended manner by bundles can easily be lowered into narrow spaces whereby considerable time will be saved. In this connection, the means for laterally supporting the lower bar ends will not impede or effect the gripping operation and the pulling out and moving the bars into their positions because the said supporting means can under these conditions be moved into a position above the gripper.

Figure 3:
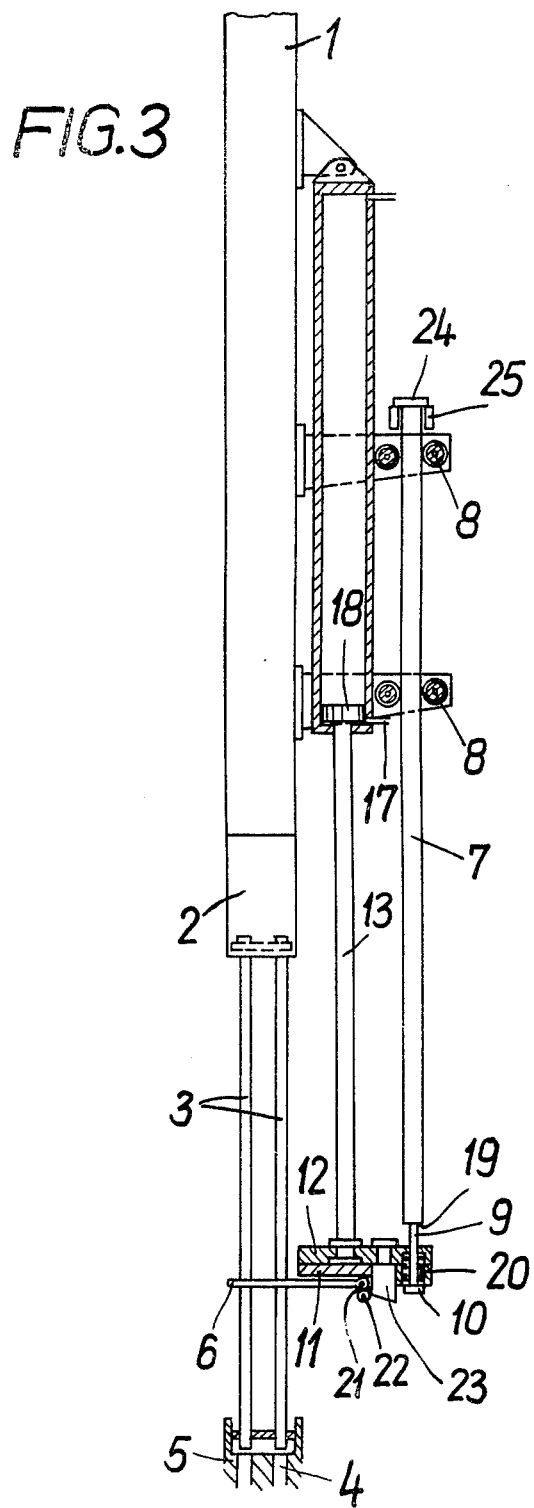
Figure 4:
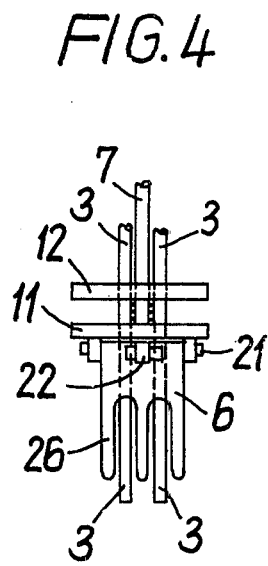
FIG. 4 shows the lower portion of FIG. 2, as seen in the direction of the arrow IV.

Referring now to the drawings in detail, it will be seen from FIGS. 1 – 3, a bar gripper 2 is provided at the lower end of an inner guiding pipe 1 which has a square-shaped cross section and is vertically displaceably guided by rollers in a nonillustrated outer guiding pipe. A plurality of control bars 3 combined to a bundle have their upper ends coupled to the bar gripper 2. For purposes of simplicity it is assumed that the bundle consists of only four control bars, but it is to be understood that the bundle may have more control bars than four. Furthermore, the control bars 3 are, in view of the limited space in the drawing, illustrated considerably shorter than they are actually in practice. FIGS. 1 – 3 show the condition in which the control bars 3 by moving the inner guiding tube 1 upwardly have just been pulled out of the narrow bores 4, for instance, of a fuel element 5 inserted into a core.

For laterally supporting the lower ends of the control bars 3 suspended on the gripper 2 there is employed in conformity with FIGS. 1 to 4, a comb-shaped flap 6 in cooperation with a guiding bar 7 which, by the aid of two pairs of throat rollers 8 mounted on the inner guiding pipe 1, may be moved in vertical direction.

The guiding bar 7 has its lower end provided with an extension 9 which has a smaller diameter, said extension 9 supporting by a lower support 10 a traverse 11. The extension 9 extends through a bore of a plate 12 which is engaged by the lower end of a piston rod 13 of a penumatic lifting mechanism. The cylinder 14 of this lifting mechanism is at its upper closed end suspended on a support 15 of the inner guiding tube 1. Connected to the cylinder 14 at the upper and lower portions thereof are conduits 16, 17 for introducing compressed air and withdrawing expanded air, said conduits being respectively located above and below the piston 18. Plate 12 is slidably guided by the extension 9 of the guiding bar 7 between an upper end position (FIGS. 1 and 2) and a lower end position (FIG. 3). The distance between said upper and lower end positions is indicated by the character $a$ at the bottom of FIG. 2. The upper end position is determined by the shoulder 19 which is formed where the extension 9 with its smaller diameter is connected to the bar 7 having a larger diameter. In its lower end position, plate 12 rests on the traverse 11. A helical pressure spring 20 which extends around the extension 9 continuously urges the plate 12 to move to its upper end position.

The comb-shaped flap 6 is mounted on the bottom side of traverse 11 in a joint 21 with a horizontal axis. A roller 22 is journaled on a leg which extends at the level of the joint 21 from the flap 6 in the direction away from the inner guiding tube 1 and the bars 3. Above said roller 22 there is provided a bolt 23, as indicated further below in connection with FIGS. 5 – 8, said bolt extending from plate 12 in downward direction and having an inclined surface.

In FIG. 1 it is assumed that the guiding bar 7 together with the traverse 11 and the flap 6 has moved upwardly as far as possible. The lower edges of the prongs of the comb-shaped flap 6 are located at a level higher than the lower edge of the gripper 2. Therefore, the flap 6 did not impede the gripper 2 when the latter, by means of the inner guiding tube 1, was lowered to such an extent that it was able to grasp the upper heads of the bars 3 mounted in the bores 4 of the fuel element 5.

When the bars 3 are now lifted out of their FIG. 1 position to a still higher level and then are to be transported by means of the charging carriage which carries the inner and outer guiding tube, the lower ends of the bars 3 will by means of the flap 6 and the guiding bar 7 be so supported that they will maintain their position relative to each other with the necessary parallelity for the subsequent insertion into other narrow bores.

To this end, in conformity with FIG. 2, the piston 18 of the lifting mechanism is lowered by the distance $h$ while still being spaced from the lower closure wall of the cylinder 14 by a distance slightly in excess of the distance $a$. That position is meant in which the guiding bar 7 which followed the downward movement of the piston 18 of the piston rod 13 and of the plate 12 rests against an abutment 25 by means of a collar 24 mounted at the upper end of bar 7.

When subsequently the piston 18 is lowered by the distance $a$ by means of compressed air which is introduced through conduit 16 into the cylinder chamber above said piston 18 while air escapes from the conduit 17, the guiding bar 7 will, due to the abument 25, not be able to follow this movement of piston 18. Furthermore, the traverse 11 retains its position of FIG. 2. However, plate 12 is against the thrust of spring 20 moved into its lower end position in FIG. 3. In this connection, the bolt 23 will with its inclined surface displace the roller 22 and thereby will bring about a pivoting of the flap 6 into the horizontal position which is shown in FIG. 3 and in which the bars 3 are closely grasped between each two prongs 26 (FIG. 4) of the comb-shaped flap 6. In contradistinction to the showing of FIG. 3, in practice the comb-shaped flap 6 grasps the bars 3 at their ends which with regard to the actual length of the bars are located considerably lower. The bars 3 are by the flap 6 grasping the same, prevented from swinging their lower ends in a direction transverse to the prongs 26. It will be appreciated that the flap 6 will be held by the strong vertically guided guiding bar so that it will be able to absorb forces in horizontal direction.

According to the embodiment of FIGS. 5 - 8, the inner guiding tube 1 which is indicated in FIG. 6 by dot-dash lines and is guided within the outer guiding pipe 27, is provided with a total of four guiding bars 28 (FIGS. 5) the smaller diameter extensions 29 of which are also shown in FIG. 6. The extensions 29 of each two guiding bars 28 are located in bores of an angle-shaped traverse 30, 31 (FIG. 6). These traverses 30, 31 embrace two edges of the inner guiding tube 1, which edges are located diagonally opposite to each other.

Above each traverse 30, 31 there is provided a plate 32 (FIG.5) which is located at the lower end of the piston rod 33 of a lifting mechanism which has a cylinder 34 connected to the inner guiding tube 1.

The extensions 29 of the two pertaining guiding bars 28 extend through two bores of each plate, for instance, plate 32 of FIG. 5. In the position illustrated in FIG. 5 in which plate 32 is lifted by the distance $a$ relative to the traverse 30, plate 32 has a support for the shoulders 35 which are formed by the merging portion from the thick guiding bars 28 with the extensions 29.

FIG. 5 shows a pair of throat rollers 36 which are journaled on the inner guiding tube 1 and guide a guiding bar 28 therebetween in vertical direction. The extensions 29 are each surrounded by a helical pressure spring 37 which on one hand rests against the bottom of a recess 38 in the traverse 30. This traverse has a further deep recess 39 into which during the lowering of the plate 32 extends a nut 40 until it engages the traverse 30. Nut 40 is mounted on a lug which protrudes in downward direction from a bore of the plate 32, said lug forming an extension of the piston rod 33.

At both legs of the traverse 30 which are arranged at a right angle with regard to each other there are on the bottom side by means of a joint bolt journaled two comb-shaped flaps 41, 42. The axes of said bolts are located horizontally and form a right angle with each other. The shaft or bolt 43 is, as indicated in FIGS. 7 and 8, located somewhat higher than the shaft 44. The bearings 45 of the shafts 43, 44 are held by bolts 46 which protrude downwardly from vertical bores of the traverse 30.

Each of the two flaps 41, 42 is at the level of the bolts 43, 44 provided with a short leg (FIGS. 7, 8) which when the flap is suspended vertically in downward direction, extends from the bolts 43, 44 in an approximately horizontal direction away from the inner guiding tube 1. Freely rotatably journaled on leg 47 is a roller 48. According to the starting position of flap 41, 42, which position is shown in solid lines in FIGS. 7 and 8, the roller 48 is located below a bore 49, 50 provided in the traverse 30. In each bore there is guided a bolt 51, 52 which extends from the plate 32 in downward direction. Each bolt 51 and 52 has on that side thereof which faces the inner guiding tube 1 a flattened portion 53 shown in FIG. 6. The lower end of each of bolts 51, 52 is slanted in such a way that an abutment surface 54, 55 is formed which is inclined at an angle of 45° and ascends in the direction toward the inner guiding tube 1.

It may be assumed that the plate 32 is, by means of the piston rod 33, lowered in conformity with the position of FIG. 2 to such an extent that the guiding bars 28 supported thereby rest at their upper ends by means of collars on abutments corresponding to the abutment 25 of FIGS. 1 - 3. When, accordingly, the piston rod 33 is, by means of compressed air, moved downardly, the piston rods 28 cannot follow this movement so that the traverse 30 arranged thereon will retain its elevational position illustrated in FIG. 5. When lowering the plate 32, consequently, its vertical distance from the traverse 30 will decrease, and the bolts 51, 52 are in bores 49, 50 moved downardly. Inasmuch as the bolt 51, as shown in FIGS. 7 and 8, in its starting position extends somewhat further downwardly than the bolt 52, and since furthermore the roller 48 is in the starting position of the flaps 41 located at a higher level than the roller 48 pertaining to the flap 42, it will be appreciated that first the roller 48 will be contacted by the inclined surface 54 of the bolt 51 and will be displaced by the latter. FIG. 7 illustrates in dot-dash lined how the downwardly moved bolt will place itself behind the roller 48, the displacement of which causes the flap 41 to pivot into the horizontal position illustrated by dot-dash lines, said position also being visible in FIG. 6.

Only when flap 41 has reached this position, the roller 48 pertaining to the flap 42 is contacted by the inclined surface 55 of bolt 52 and displaced by the same so that as indicated in FIG. 8 by dot-dash lines, flap 42 is pivoted into the horizontal position. As shown in FIG. 6, the prongs of the flaps 41 and 42 located one above the other along a horizontal plane will cross each other at a right angle. In the gaps which thus remain between the upper and lower prongs there are located the control bars 3.

Since, however, as shown in FIG. 6, not all bars 3 of the bundle grasped by the gripper are on at least three sides grasped by upper and lower prongs of the two flaps which prongs cross each other at a right angle, a third flap 56 is below the flap 42 brought into engagement with the bars 3 in such a way that the slots extend at an angle of approximately 45° with regard to the prongs of the flaps 41. The third flap 56 is mounted below the traverse 31 principally in the same manner as the flaps 41, 42. This is effected by means of a joint bolt 57 with hoirzontal axis. FIG. 6 shows two bolts 46 which support the bearings and a bolt 58 with a flattened portion 53 which during the lowering of a plate corresponding to the plate 32 will in the same manner as it was effected for the flaps 41 and 42, by means of bolts 51, 52 cause the flap 56, by means of a roller to move into its engaging position. FIG. 6 further shows that the traverse 31 has a recess 59 similar to the recess 39 of traverse 30 for receiving a nut at the lower end of the piston rod which is intended for lifting and lowering the plate. As shown in FIG. 6 by means of the three flaps 41, 42 and 56, it will be brought about that all control bars 3 are, at least on three sides, enclosed between intercrossing prongs of the flaps so that they cannot escape to any side.

It is, of course, to be understood that the present invention is, by no means, limited to the specific showing in the drawings, but also comprises any modifications within the scope of the appended claims.

What we claim is:

1. A device for moving long and thin bodies into narrow spaces, comprising vertically displaceable gripper means to which the upper ends of long and thin bodies can be coupled holder means guided to be displaceable along said gripper means downwards and upwards, power operable means attached to said gripper means and associated with said holder means for lowering and lifting it, guiding means at the lower end of said holder means attached to said holder means in such a manner that it can be moved from an ineffective first position into a second position in which it supports in lateral direction the lower ends of said long and thin bodies when the latter are coupled to said gripper means but allowing upward and downward movement of said bodies relative to it, actuating means connected to said power operable means and associated with said guiding means for moving it from said first position into said second position and vice versa.

2. A device according to claim 1 which includes a first abutment means attached to said gripper means and associated with said holder means in such a manner that it limits the downard movement of said holder means to a lowest position in which said guiding means is near to the lower ends of said long and thin bodies and which further includes a follower means reciprocably connected to said power operable means constituting a second abutment means which supports said holder means as long as said holder means is moved downwards as far as into its lowest position, said actuating means being arranged at said follower means such that it moves said guiding means into its second position when said follower means will be lowered while said holder means remains in its lowest position.

3. A device according to claim 2 in which said holder means is constituted by a bar including a lower offset portion forming a shoulder with its adjacent upper portion, a traverse supported by the lower end of said offset portion, said guiding means being pivotally connected to said traverse, said follower means having a bore through which said offset portion slidably extends and forming said second abutment for said shoulder, said actuating means extending from said follower means downwards and engaging a lever arm of said guiding means.

4. A device according to claim 1, in which said guiding means includes at least two comb-shaped flaps with the prongs thereof directed in different directions, and at least two actuating means respectively operatively connected to said flaps for successively moving the same into substantially horizontal overlapping positions with each other so as to cause their respective prongs to define with each other spaces for receiving therein said long and thin bodies to be held and supported by said holding means while engaging the latter from different sides.

5. A device according to claim 4, in which said two comb-shaped flaps are in joints pivotally supported by a traverse attached to the lower end of said holder means, said joints being arranged in different horizontal levels, the prongs of one of said comb-shaped flaps crossing the prongs of the other one of said comb-shaped flaps when said guiding means occupies said second position, said at least two actuating means being supported by said follower means in such a manner that they one after the other engage lever arms extending from said flaps when said follower means are lowered by said power operable means while said holder means is held in its lowest position by an abutment means attached to said gripper means.

6. A device according to claim 5, in which said gripper means is of substantially square cross-sectional shape, and in which said traverse is angle shaped having its apex located at least approximately on one diagonal plane of said cross-sectionally square-shaped gripper means, said device also including an additional traverse located near that edge of said gripper means which is diagonally opposite said one edge of said gripper means, an additional flap with comb-shaped prongs pivotally connected to said additional traverse and pivotal about an axis substantially perpendicular to said one diagonal plane.

* * * * *

UNITED STATES PATENT OFFICE
CERTIFICATE OF CORRECTION

Patent No. 3,937,332    Dated February 10, 1976

Inventor(s) Hinrich Flessner et al

It is certified that error appears in the above-identified patent and that said Letters Patent are hereby corrected as shown below:

On the oover sheet item [73] should read --FRIED. KRUPP Gesellschaft mit beschränkter Haftung Essen, Federal Republic of Germany.

Signed and Sealed this

Sixth Day of July 1976

[SEAL]

Attest:

RUTH C. MASON
*Attesting Officer*

C. MARSHALL DANN
*Commissioner of Patents and Trademarks*